United States Patent
Chang et al.

(10) Patent No.: US 8,467,578 B2
(45) Date of Patent: Jun. 18, 2013

(54) METHOD AND APPARATUS FOR EXTRACTING SCENERY DEPTH INFORMATION

(75) Inventors: Chuan Chung Chang, Zhubei (TW); Chir Weei Chang, Longtan Shiang (TW); Yung Lin Chen, Beigang Town (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 1001 days.

(21) Appl. No.: 12/505,481

(22) Filed: Jul. 18, 2009

(65) Prior Publication Data

US 2010/0215219 A1      Aug. 26, 2010

(30) Foreign Application Priority Data

Feb. 20, 2009 (TW) ................. 98105357 A (51) Int. Cl.
*G06K 9/00*         (2006.01)
(52) U.S. Cl.
USPC .......................................... 382/106; 382/312
(58) Field of Classification Search
USPC .................. 382/106, 210, 312; 359/358, 563, 359/564
See application file for complete search history.

(56) References Cited

U.S. PATENT DOCUMENTS

| | | | |
|---|---|---|---|
| 5,521,695 A | 5/1996 | Cathey, Jr. et al. | |
| 5,748,371 A * | 5/1998 | Cathey et al. | 359/558 |
| 6,940,649 B2 * | 9/2005 | Dowski, Jr. | 359/558 |
| 2005/0264886 A1 | 12/2005 | Dowski, Jr. | |
| 2008/0151391 A1 | 6/2008 | Zalevsky et al. | |

FOREIGN PATENT DOCUMENTS

CN     101241173 A     8/2008

OTHER PUBLICATIONS

Apr. 18, 2012 Office Action for Chinese counterpart application.
Apr. 18, 2012 Office Action for Chinese counterpart application translated into English.
Edward R. Dowski, Jr. and W. Thomas Cathey, Wavefront Coding for Detection and Estimation with a Single-Lens Incoherent Optical System, pp. 2451-2454, Department of Electrical and Computer Engineering University of Colorado, Boulder, CO 80309.

* cited by examiner

*Primary Examiner* — Mark Hellner
(74) *Attorney, Agent, or Firm* — Egbert Law Offices, PLLC (57) ABSTRACT

A method and optical apparatus are utilized not only to increase the degree of the similarity of the point spread functions of different fields of view, but also to maintain the degree of the difference of point spread functions which are along the optical axis of the optical apparatus. Using the degree of the difference of on-axis point spread functions, the depth information of scenery can be extracted.

15 Claims, 14 Drawing Sheets

METHOD AND APPARATUS FOR EXTRACTING SCENERY DEPTH INFORMATION

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The disclosure relates to a method and apparatus for extracting scenery depth information.

2. Description of Related Art Including Information Disclosed Under 37 CFR 1.97 and 37 CFR 1.98.

The extraction of depth information for different objects in a view is an important issue in fields of stereo display, distance measurement systems and systems for displaying depth profile. Conventional extraction methods and apparatus can be divided into two categories: active and passive. In passive systems, dual-lens, multi-lens or multi-aperture imaging systems based on the "parallax" concept are utilized. However, these systems require several imaging lenses or several imaging sensors to obtain the information of stereo images. In the active systems, additional signal sources (for example, light sources) are utilized to direct signals toward different objects. The distances of the different objects are obtained in accordance with the time required for signal propagation. Alternatively, the objects can be illuminated with a particular distribution pattern and the distances between objects can then be estimated in accordance with the degree of pattern deformation on the surface of the objects.

In addition, U.S. Pat. No. 5,521,695 discloses that by using a specially designed optical element, each point on objects in the object plane can produce four corresponding points in the image plane. The distances between objects can be obtained according to variations of distances between the 4 corresponding points.

BRIEF SUMMARY OF THE INVENTION

According to one embodiment, an apparatus for extracting scenery depth information comprises an optical element and a coding element, wherein the coding element is placed on routes of object lights passing through the optical element for modulating point spread functions of the optical element.

According to another embodiment, a method for extracting scenery depth information comprises: obtaining an image with an optical apparatus; obtaining at least one point spread function of the optical apparatus; and scanning areas of the image and performing restoration-comparison procedures in accordance with the point spread function.

BRIEF DESCRIPTION OF THE SEVERAL VIEWS OF THE DRAWINGS

The accompanying drawings, which are incorporated in and constitute a part of this specification, illustrate embodiments of the disclosure and, together with the description, serve to explain the principles of the invention.

DETAILED DESCRIPTION OF THE INVENTION

In conventional image-capturing systems, point spread functions (PSFs) of a lens or a lens set vary with different object distances and different fields of view (FOVs). In order to obtain the distances between objects and the depth information of the objects, the variations of the PSFs which are caused by different object distances and the different FOVs should be taken into account for back-end image processes.

A method and optical apparatus for extracting scenery depth information are disclosed. The optical apparatus with a coding element is utilized not only to increase the degree of the similarity of the PSFs of different fields of view, but also to maintain the degree of the difference of point spread functions which are along the optical axis of the apparatus. Using the degree of the difference of on-axis PSFs, the depth information of scenery can be extracted.

Figure 1:
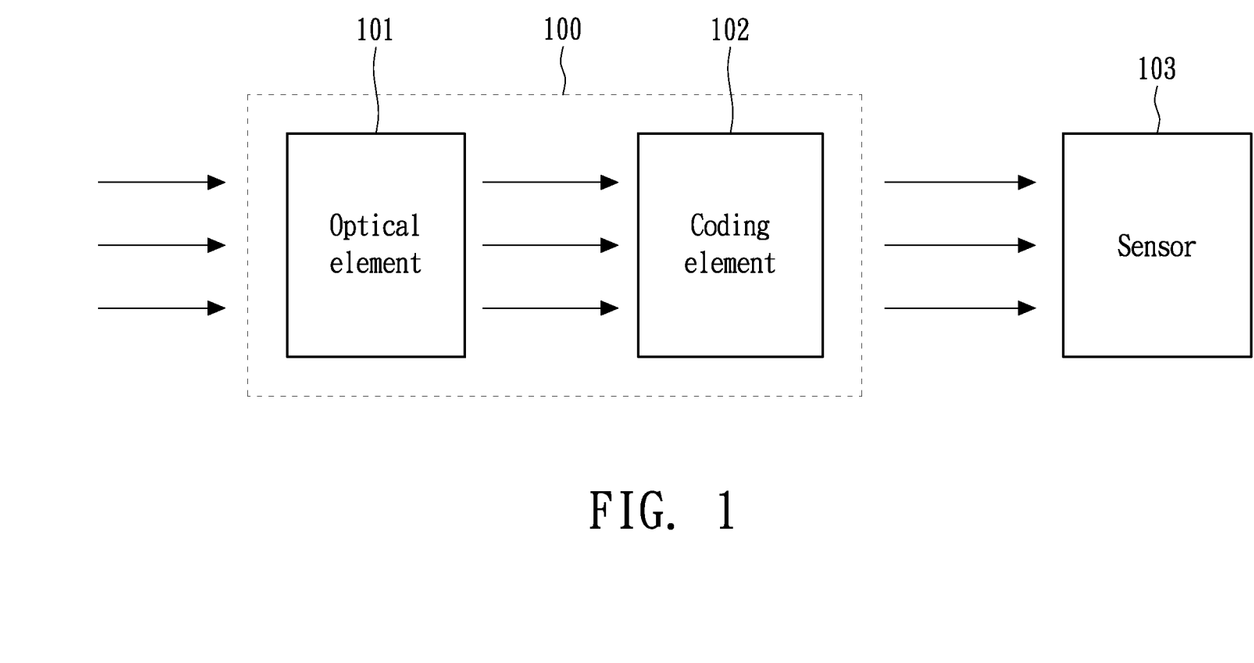
FIG. 1 illustrates a diagram of an apparatus for extracting depth information in accordance with an exemplary embodiment.

FIG. 1 illustrates a diagram of an apparatus for extracting depth information in accordance with an exemplary embodiment. After passing through a depth information-extracting apparatus 100, incident lights are received by a sensor 103. The depth information-extracting apparatus 100 comprises an optical element 101 and a coding element 102. The coding element 102 can also be placed in front of the optical element 101. The optical element 101 used for imaging can be a single lens, a lens set or a reflective imaging lens set. The coding element 102 can be a wavefront phase coding element which modulates phases of wavefronts or a wavefront amplitude coding element which modulates amplitudes of wavefronts. The coding element 102 also can be a wavefront phase-amplitude coding element which modulates phases of wavefronts and amplitudes of wavefronts. If the coding element 102 is the wavefront phase coding element, codes of the coding element 102 are associated with axis symmetry characteristics. The wavefront codes of the coding element 102 can be described with orthogonal coordinate systems. In this exemplary embodiment, the wavefront codes of the coding element 102 are described by the following equation:

$$W(x, y) = \sum_{n,l,m} A_{nx}x^{2n} + A_{ny}y^{2n} + A_{lmxy}x^l y^m$$

where x and y are coordinate positions of the coding element 102 n is a positive integer, l+m is an even number, $A_{nx}$ and $A_{ny}$ are the coefficients in the terms $x^{2n}$ and $y^{2n}$ respectively and $A_{lmxy}$ is the coefficient in the term xy.

The coding element 102 can be placed at the position of the diaphragm, near the diaphragm, at the position of the exit pupil, near the exit pupil, at the position of the entrance pupil or near the entrance pupil of the depth information-extracting apparatus 100. The coding element 102 can also be integrated with the optical element 101. For example, the coding element 102 can be formed on the surface of the optical element 101. After the integration, the wavefront codes can be described by the following equation:

$$W'(x,y)=W(x,y)+W_0(x,y),$$

were W'(x,y) is the wavefront code after integrating the depth information-extracting apparatus 100 with with the coding element 102, and $W_0(x,y)$ is the wavefront code before integrating the depth information-extracting apparatus 100 with the coding element 102. Those skilled in the art realize that the above-mentioned W'(x,y), W(x,y) and $W_0(x,y)$ also can be described by Zernike polynomial. The above-mentioned method is used for placing the coding element 102 so that the optical wavefront, produced by the wavefront of the abject light to be captured passing through the depth information-extracting apparatus 100 with the coding element 102, is described by W(x,y). In addition, the coding element 102 can be a refractive element, a diffractive element or an element having refractive and diffractive characteristics.

In accordance with another exemplary embodiment, for the optical element 101, the effective focal length is 10.82 mm, the F # is 5 and the full FOV is 10.54°. The diagonal length of the sensor 103 is 2 mm. The phase codes of the coding element 102 are coded by the above-mentioned W(x,y) where n=2, $A_{2x}=A_{2y}=22.8$ PI and $A_{lmxy}=0$.

Figure 2A:
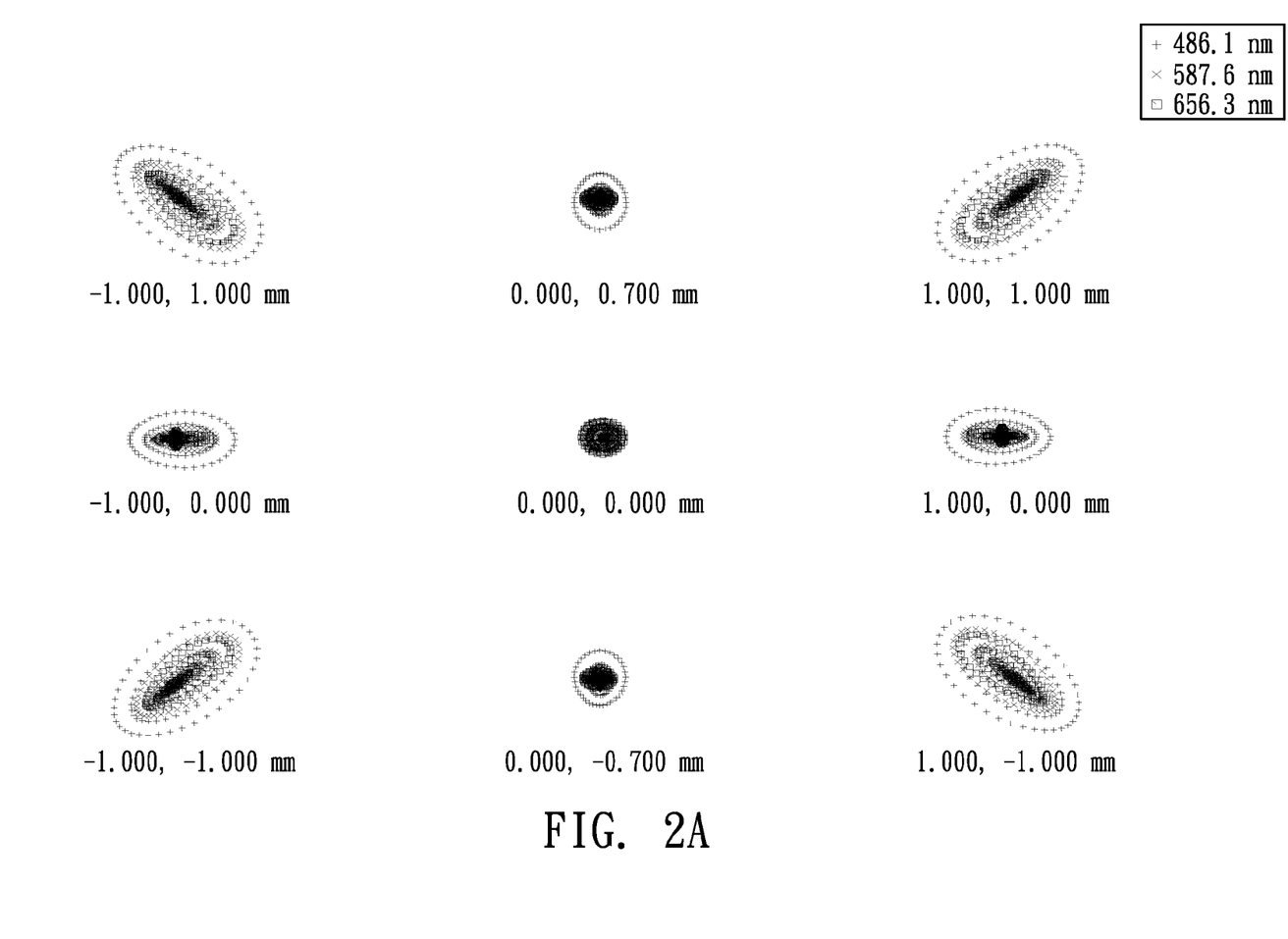
FIG. 2A illustrates spot diagrams of PSFs according to different FOVs when using an optical element to capture an image of an object with an object distance of 1000 mm.
Figure 2B:
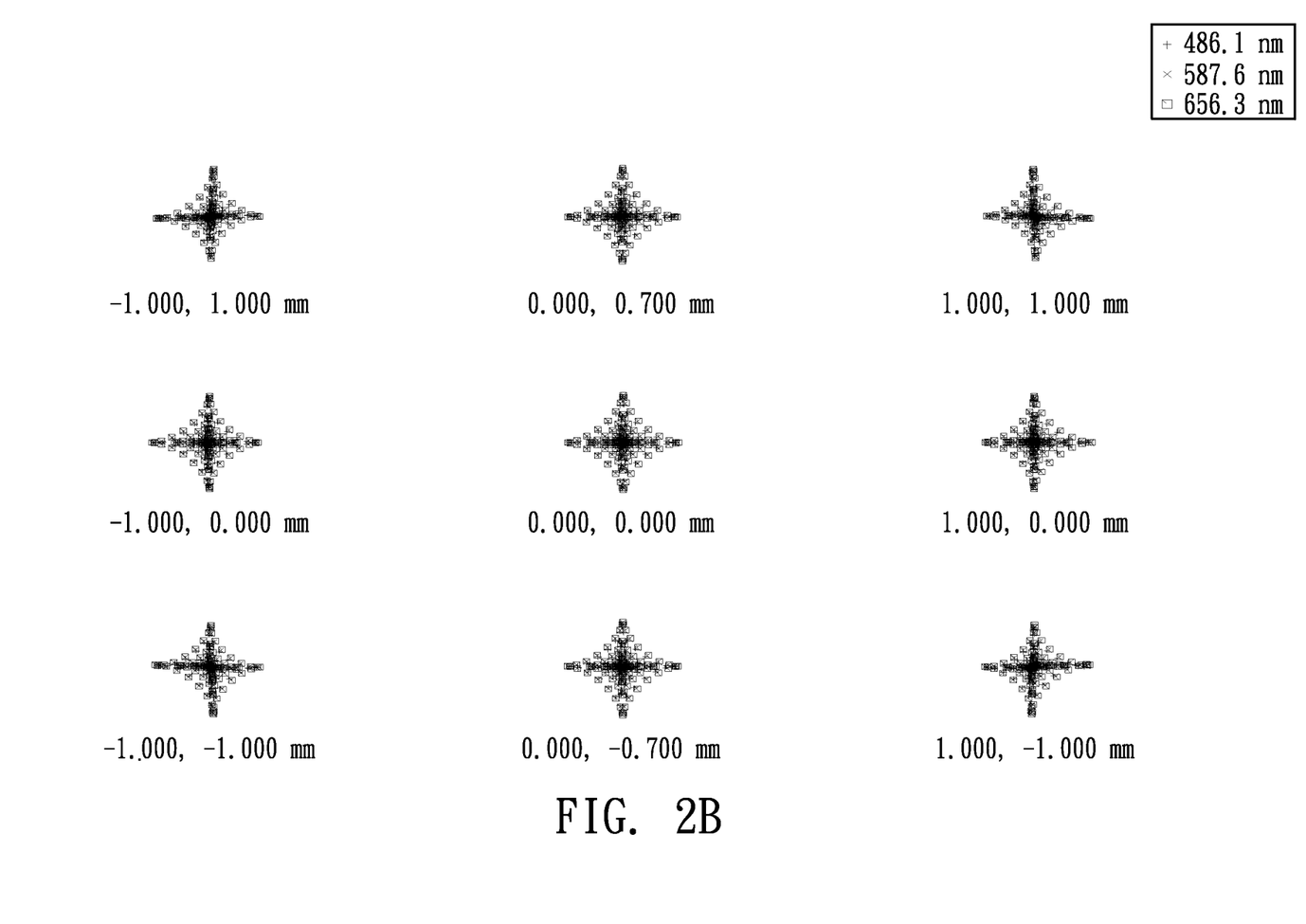
FIG. 2B illustrates spot diagrams of PSFs according to different FOVs when using a depth information-extracting apparatus to capture an image of the object with the object distance of 1000 mm in accordance with one embodiment.

FIG. 2A illustrates the spot diagrams of the PSFs of different FOVs with different wavelengths, red light (656.3 nm), green light (587.6 nm) and blue light (486.1 nm), when using the optical element 101 to capture an image of an object with an object distance of 1000 mm. FIG. 2B illustrates the spot diagrams of the PSFs for the different FOVs when using the optical element 101 associated with the coding element 102 to capture an image of the object with the object distance 1000 mm.

Figure 3A:
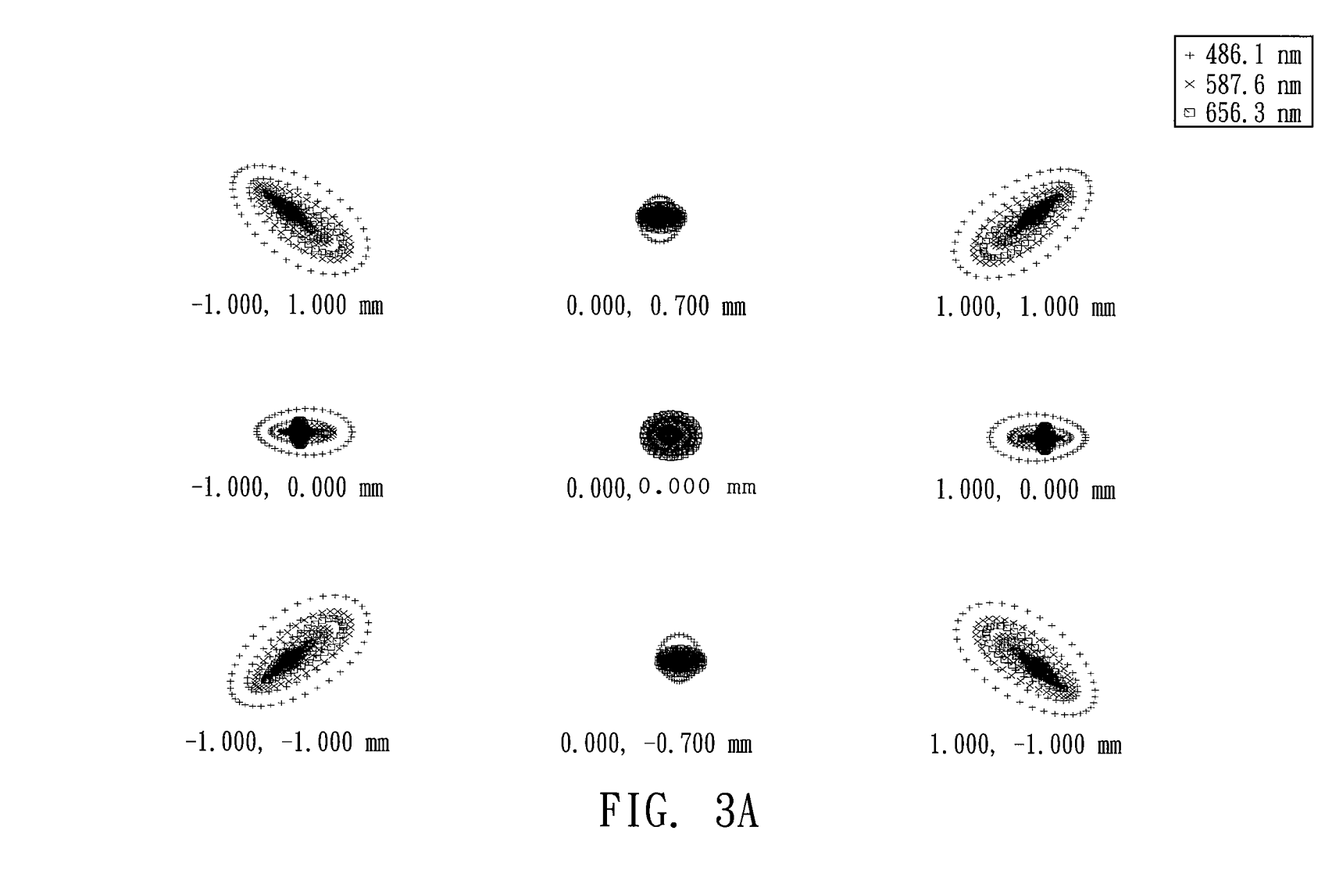
FIG. 3A illustrates spot diagrams of PSFs according to different FOVs when using an optical element to capture an image of an object with an object distance of 790 mm in accordance with the embodiment.
Figure 3B:
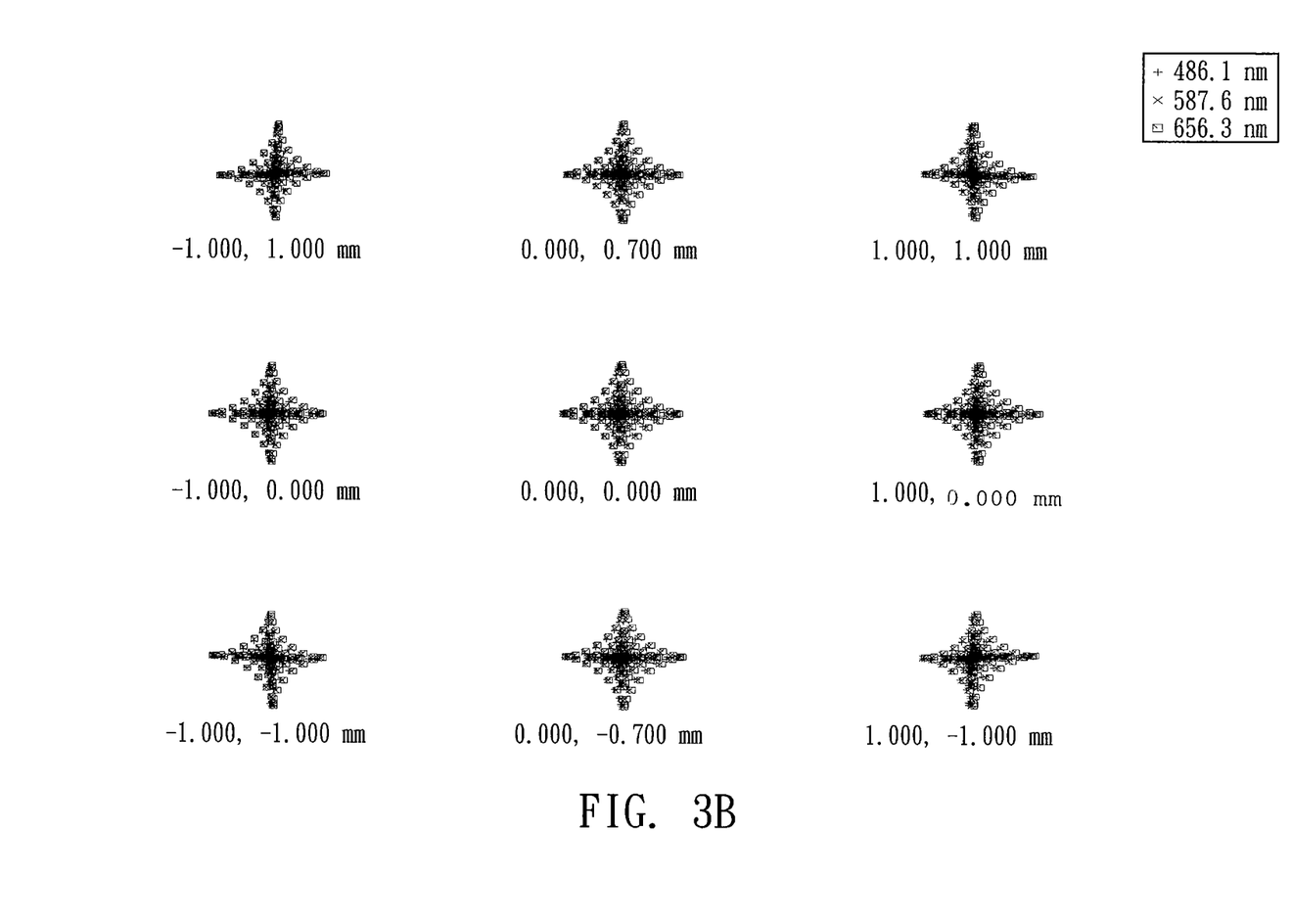
FIG. 3B illustrates spot diagrams of PSFs according to different FOVs when using a depth information-extracting apparatus to capture an image of the object with the object distance of 790 mm in accordance with the embodiment.

FIG. 3A illustrates the spot diagrams of the PSFs of different FOVs with the different wavelengths, red light (656.3 nm), green light (587.6 nm) and blue light (486.1 nm), when using the optical element 101 to capture an image of an object with an object distance of 790 mm. FIG. 3B illustrates the spot diagrams of the PSFs for the different FOVs when using the optical element 101 associated with the coding element 102 to capture an image of the object with the object distance 790 mm.

Figure 4A:
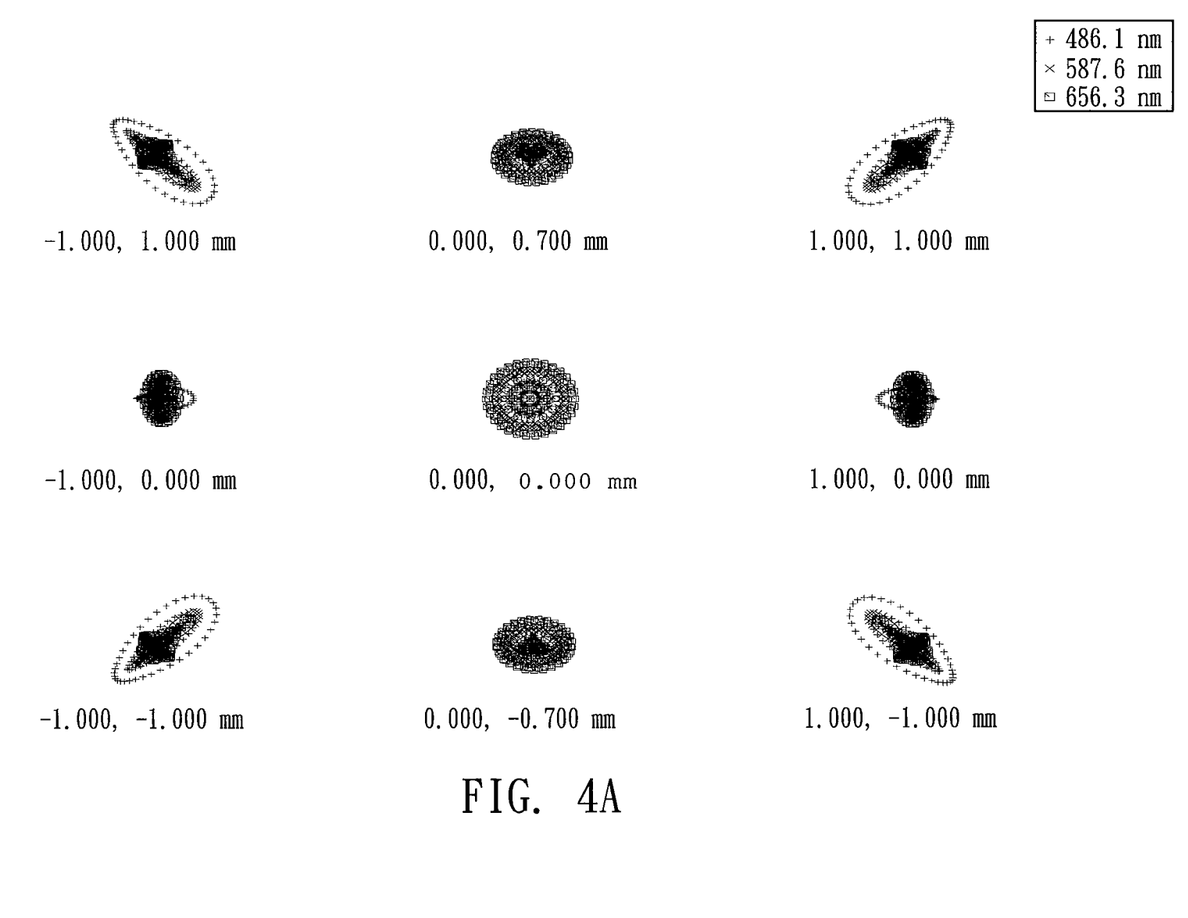
FIG. 4A illustrates spot diagrams of PSFs according to different FOVs when using an optical element to capture an image of an object with an object distance of 513 mm.
Figure 4B:
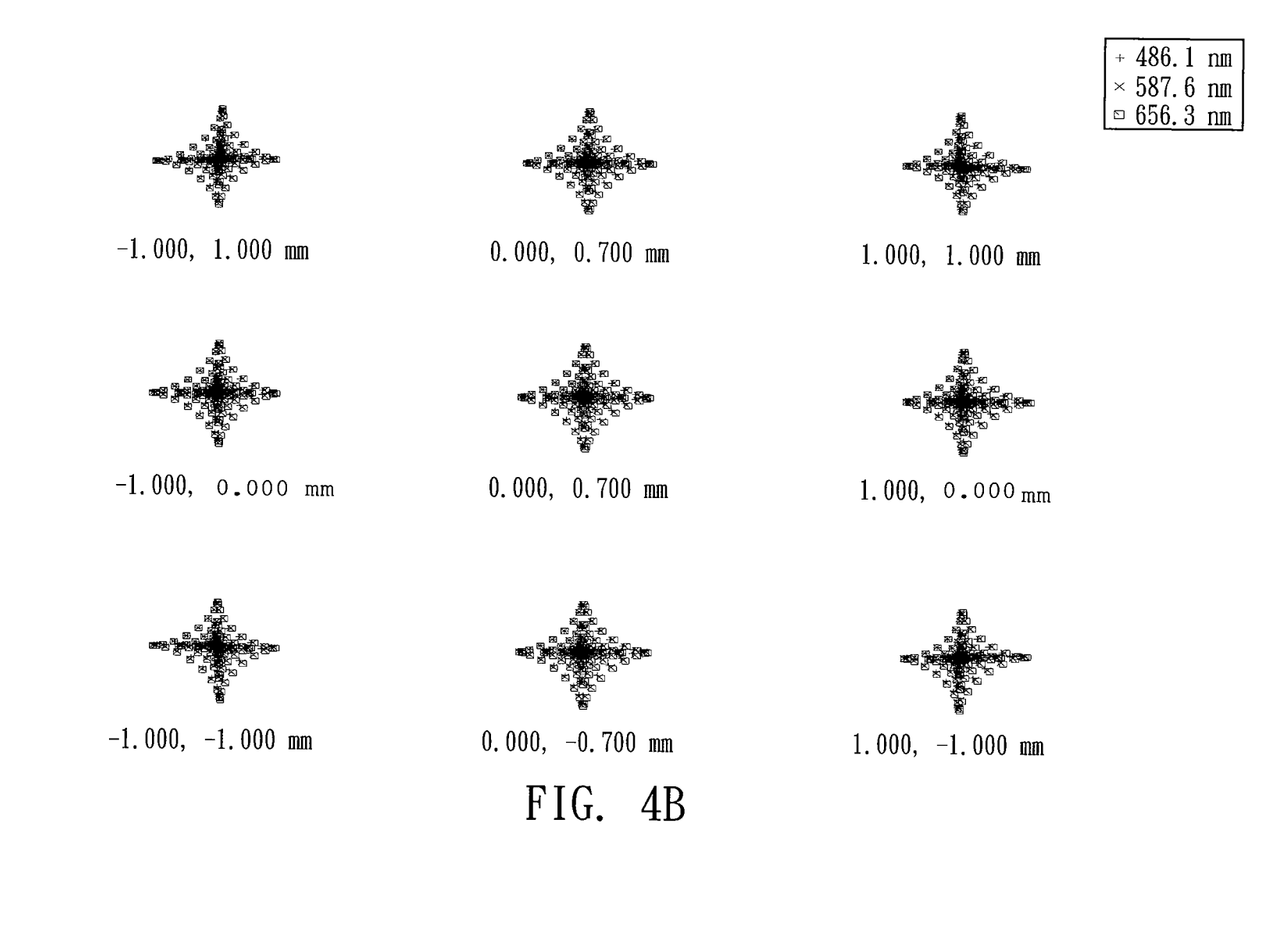
FIG. 4B illustrates spot diagrams of PSFs according to different FOVs when using a depth information-extracting apparatus to capture an image of the object with the object distance of 513 mm in accordance with the embodiment.

FIG. 4A illustrates the spot diagrams of the PSFs of different FOVs with the different wavelengths, red light (656.3 nm), green light (587.6 nm) and blue light (486.1 nm), when using the optical element 101 to capture an image of an object with an object distance of 513 mm. FIG. 4B illustrates the spot diagrams of the PSFs for the different FOVs with the different wavelengths, red light (656.3 nm), green light (587.6 nm) and blue light (486.1 nm), when using the optical element 101 associated with the coding element 102 to capture an image of the object with the object distance 513 mm.

Figure 5:
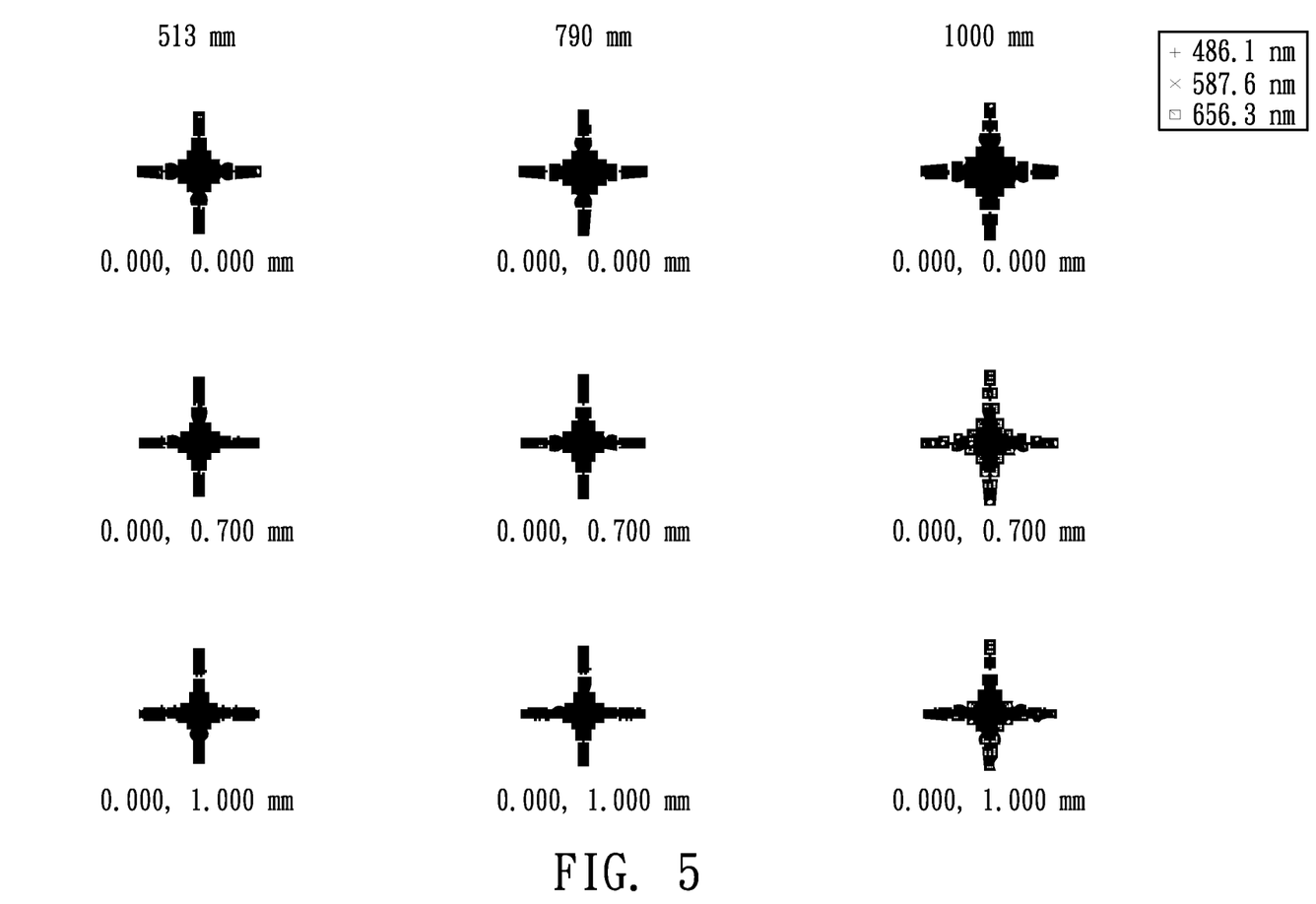
FIG. 5 illustrates spot diagrams of PSFs according to objects at different heights when using a depth information-extracting apparatus (without using xy term) to capture images of objects with different object distances in accordance with another embodiment.

In accordance with another exemplary embodiment, for the optical element 101, the effective focal length is 10.82 mm, the F # is 5 and the full FOV is 10.54°. The diagonal length of the sensor 103 is 2 mm. The phase codes of the coding element 102 are coded by the above-mentioned W(x,y) where n=3, $A_{3x}=A_{3y}=12.7$ PI and $A_{lmxy}=0$. FIG. 5 illustrates the spot diagrams of the PSFs of different FOVs (at the heights of 0 mm, 0.7 mm and 1 mm respectively in the image plane) with the different wavelengths, red light (656.3 nm), green light (587.6 nm) and blue light (486.1 nm), when using the optical element 101 associated with the coding element 102 to capture images of objects with different object distances (513 mm, 790 mm and 1000 mm).

Figure 6:
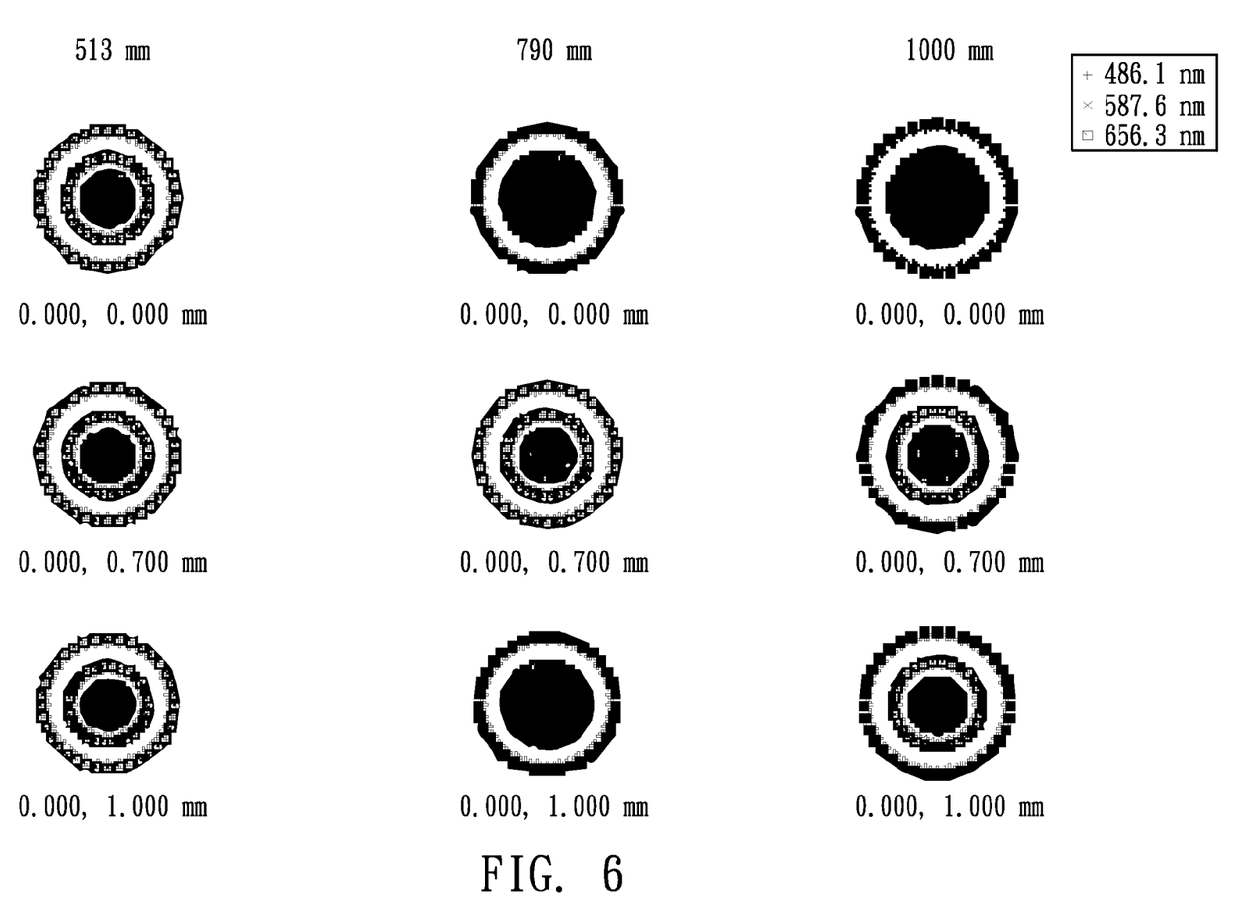
FIG. 6 illustrates spot diagrams of PSFs according to objects at different heights when using a depth information-extracting apparatus (using xy term) to capture images of objects with different object distances in accordance with another embodiment.

In accordance with another exemplary embodiment, for the optical element 101, the effective focal length is 10.82 mm, the F # is 5 and the full FOV is 10.54°. The diagonal length of the sensor 103 is 2 mm. The phase codes of the coding element 102 are coded by the above-mentioned W(x,y) where n=2, $A_{2x}=A_{2y}=19.1$ PI and $A_{22xy}=9.55$ PI. FIG. 6 illustrates the spot diagrams of the PSFs of different FOVs (at the heights of 0 mm, 0.7 mm and 1 mm respectively in the image plane) with the different wavelengths, red light (656.3 nm), green light (587.6 nm) and blue light (486.1 nm), when using the optical element 101 associated with the coding element 102 to capture images of objects with different object distances (513 mm, 790 mm and 1000 mm).

Figure 7:
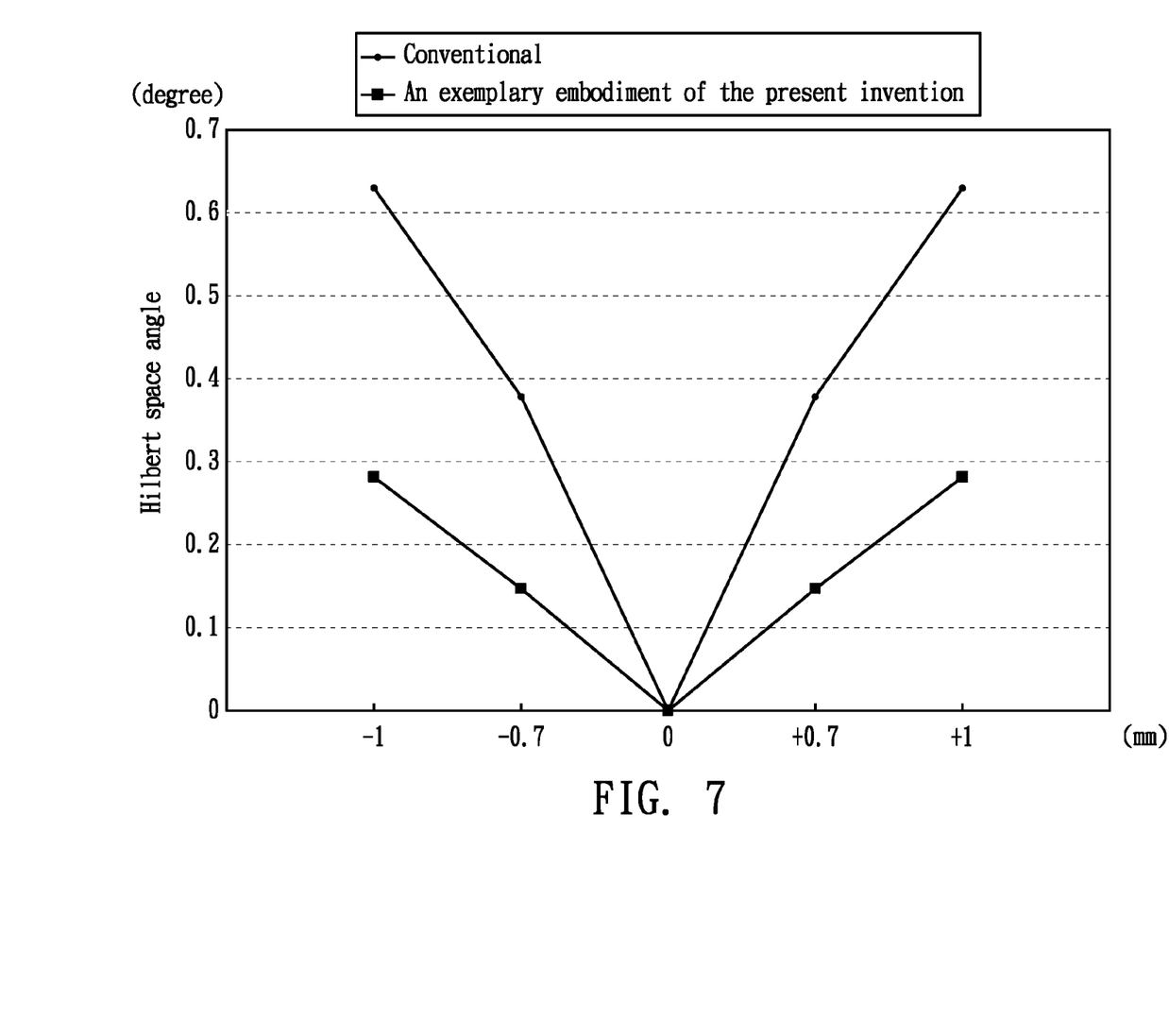
FIG. 7 shows a comparison diagram for similarities of PSFs at the same object distance but different FOVs in accordance with the embodiment.
Figure 8:
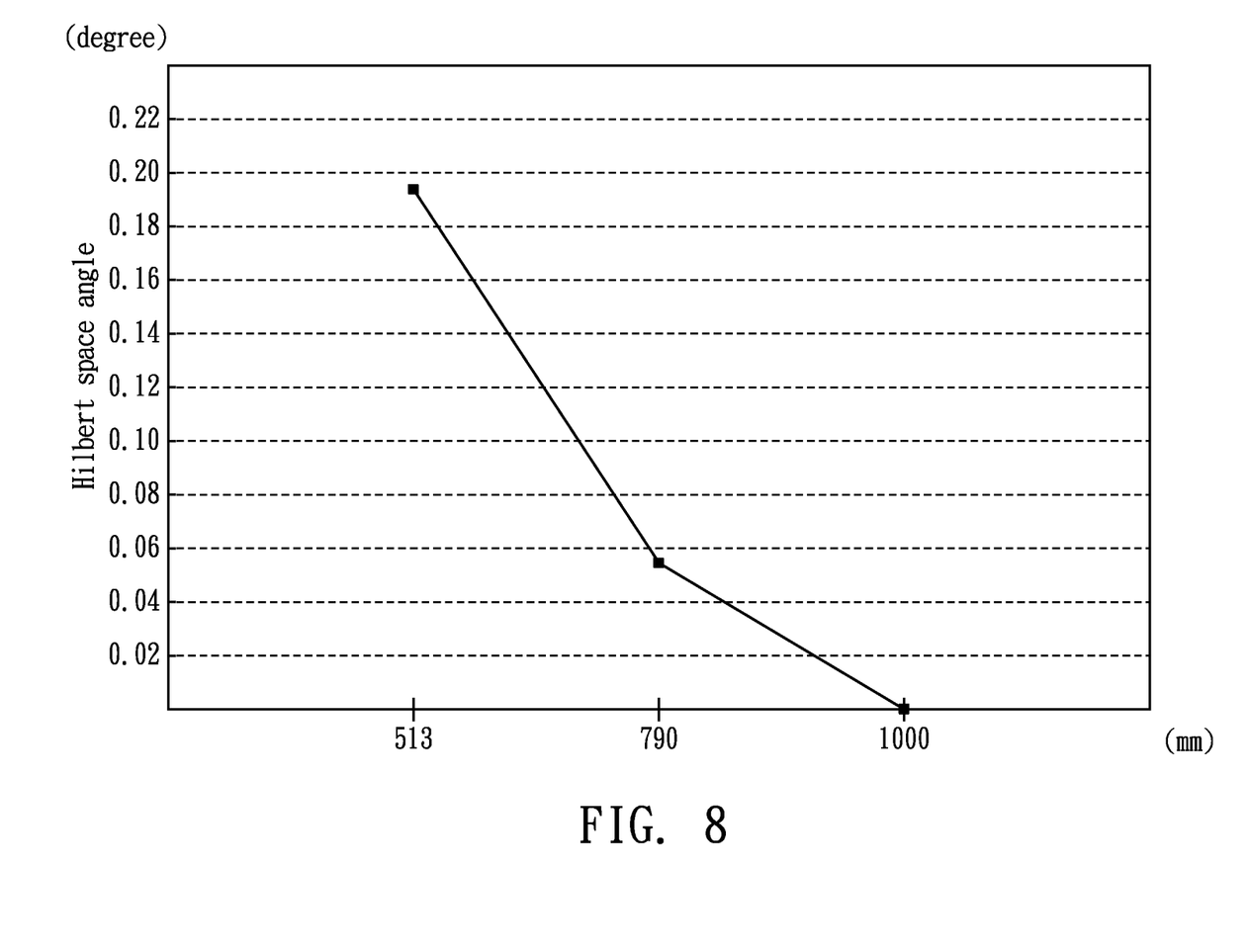
FIG. 8 shows a comparison diagram for the similarities of PSFs at different object distances which are along the optical axis of a depth information-extracting apparatus in accordance with the embodiment.

In contrast to the spot diagrams of the PSFs formed only by using the optical element 101, FIG. 2A to FIG. 6 show that at the same object distance the degrees of the variations of the shapes of the PSFs of different FOVs are quite small when using the optical element 101 associated with the coding element 102. In order to verify the improvement of the similarity of the PSFs, the Hilbert space angle is utilized to calculate the similarity of the PSFs. FIG. 7 shows a comparison diagram for the similarity of the PSFs at a single object distance, 790 mm, but different FOVs. FIG. 8 shows a comparison diagram for the similarity of the PSFs at different object distances which are along the optical axis of the depth information-extracting apparatus 100. As shown in FIG. 7, in accordance with the embodiment of the present invention, the depth information-extracting apparatus 100 comprising the optical element 101 and the coding element 102 increases the degree of the similarity of PSFs of different FOVs (smaller Hilbert space angles represent higher degrees of similarity). On the other hand, as shown in FIG. 8, the depth information-extracting apparatus 100 also maintains the degree of the difference of the PSFs which are along the optical axis of the apparatus 100.

The wavelengths used for the depth information-extracting apparatus 100, the optical element 101 or the coding element 102 coded by the above-mentioned equation and associated with the optical element 101 are not limited to 656.3 nm, 587.6 nm and 486.1 nm.

In addition to the above-mentioned depth information-extracting apparatus, a method in accordance with another embodiment of the present invention is described as follows to enable those skilled in the art to practice the present invention.

Figure 9:
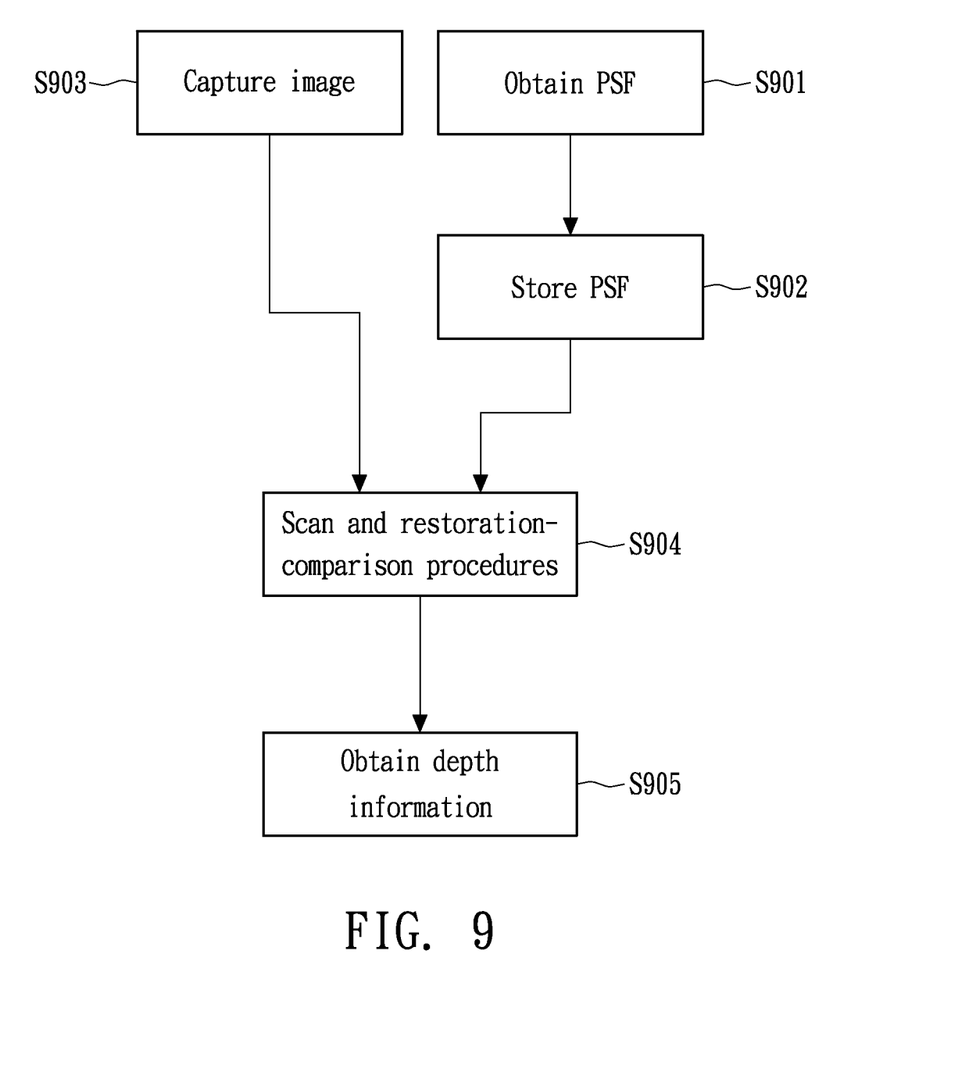
FIG. 9 is a flowchart illustrating an exemplary embodiment of a depth information-extracting method in accordance with another embodiment.
Figure 10:
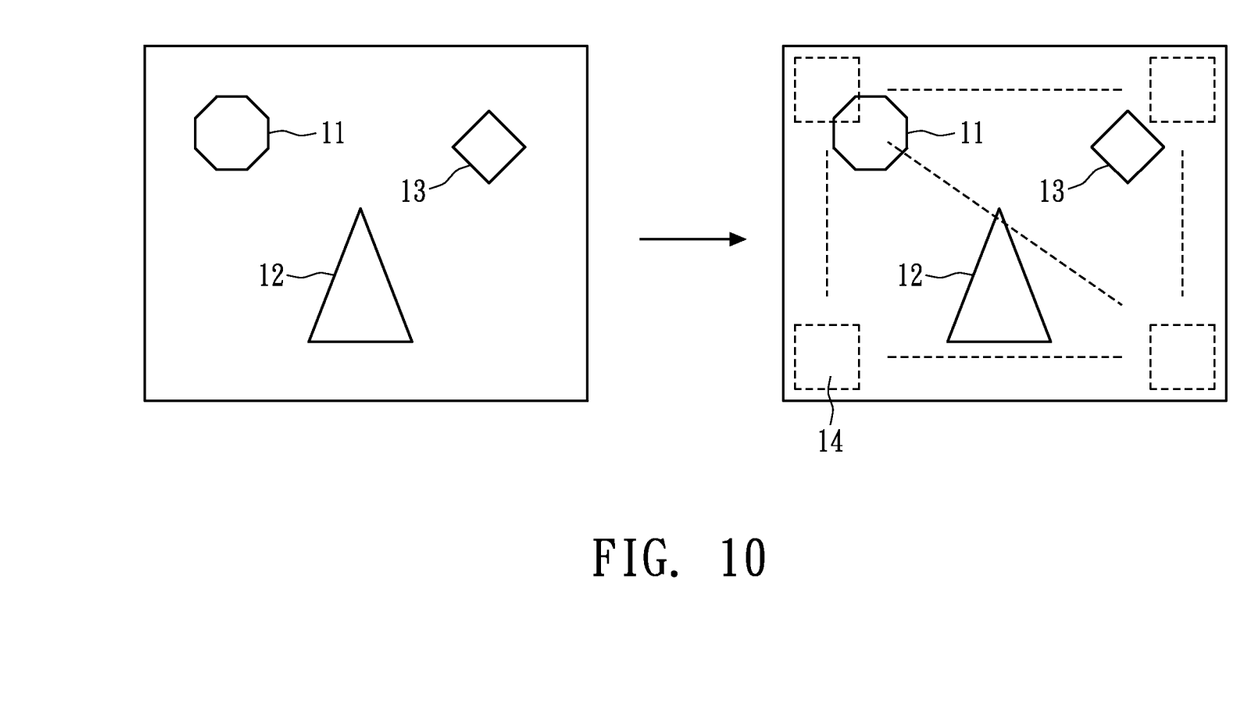
FIG. 10 shows a diagram for scanning images in accordance with the embodiment.

FIG. 9 is a flowchart illustrating an exemplary embodiment of a method for extracting depth information. In step S901, the PSFs of the depth information-extracting apparatus 100 for imaging an object with different object distances are obtained. The PSFs can be obtained by measuring the apparatus 100 or in accordance with the design parameters of the apparatus 100. In step S902, the PSFs are stored. On the other hand, in step S903, the depth information-extracting apparatus 100 is used for imaging a scene, which includes objects (11, 12 and 13) with different object distances, then capturing an image of the scene with depth information. Next, in step S904 the stored PSFs are used for performing scan procedures and restoration-comparison procedures for the image with different object distances. FIG. 10 shows a diagram for scanning an image. By moving a filter kernel 14 along the X-axis and Y-axis, different objects (11, 12 and 13) with different object distances are scanned, restored and compared. Wiener filters or direct inverse operations can be used for the restoration-comparison procedures to restore the images. After restoring the images, mean square errors (MSEs) are calculated for the restored images and then the MSEs are compared with predetermined thresholds. In step S905, the object distances of the restored images can be determined in accordance with the comparison results. In addition, in step S904, edge detection methods also can be applied to evaluate the qualities of the restored images. The evaluation results can be further used to determine the object distances in step S905.

Figure 11A:
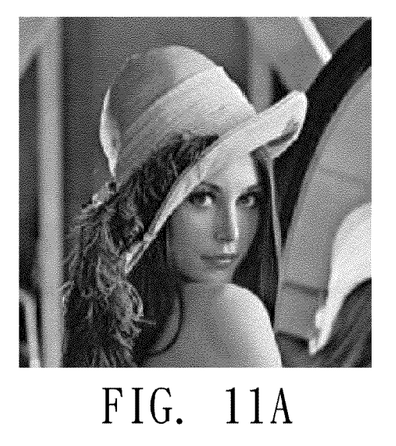
FIG. 11A shows the restored image with an object distance of 1000 mm in accordance with the embodiment.
Figure 11B:
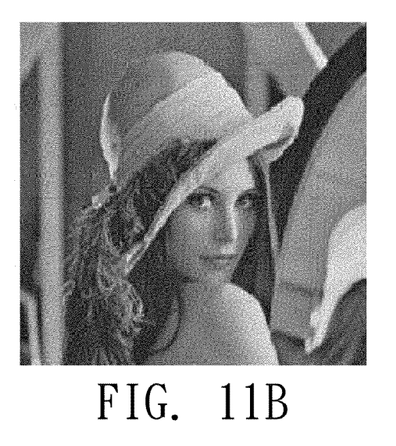
FIG. 11B shows the restored image with an object distance of 980 mm in accordance with the embodiment.
Figure 11C:
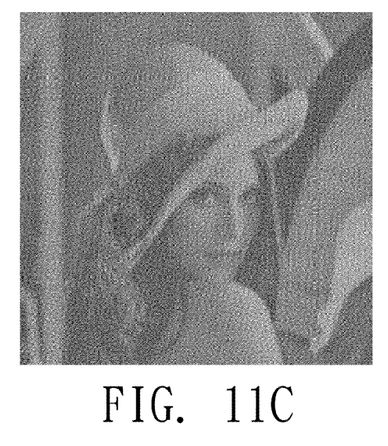
FIG. 11C shows the restored image with an object distance of 900 mm in accordance with the embodiment.
Figure 11D:
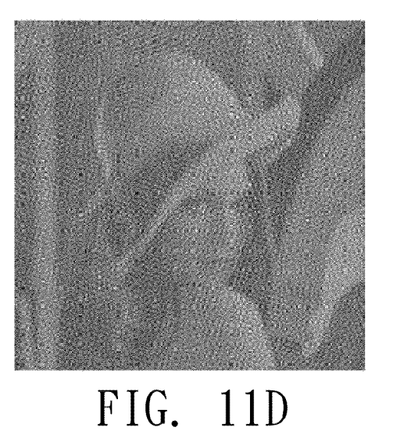
FIG. 11D shows the restored image with an object distance of 790 mm in accordance with the embodiment.
Figure 11E:
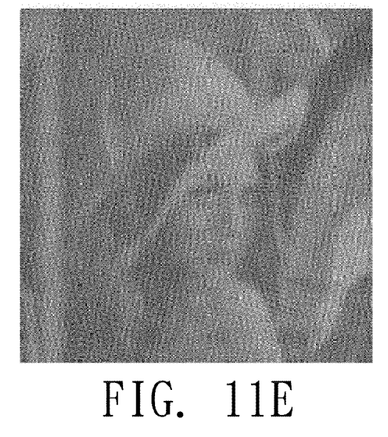
FIG. 11E shows the restored image with an object distance of 513 mm in accordance with the embodiment.

In accordance with an exemplary embodiment, five images of an object, Lena, are obtained with object distances of at 513, 790, 900, 980 and 1000 mm. FIG. 11A shows the restored image with an object distance of 1000 mm. FIG. 11B shows the restored image with an object distance of 980 mm. FIG. 11C shows the restored image with an object distance of 900 mm. FIG. 11D shows the restored image with an object distance of 790 mm. FIG. 11E shows the restored image with an object distance of 513 mm. Because the PSFs of the depth information-extracting apparatus 100 for capturing an image of an object with the object distance 1000 mm is used for scanning and restoring, the restored image with the object distance 1000 mm has the best restoration outcome with the MSE of $2.4 \times 10^{-7}$. Accordingly, the object distance of 1000 mm is determined in step S905.

In the exemplary embodiment, the depth information-extracting apparatus 100 with the coding element 102 is utilized not only to increase the degree of the similarity of the point spread functions of different fields of view, but also to maintain the degree of the difference of point spread functions which are along the optical axis of the apparatus 100. Based on the degree of the difference of on-axis PSFs, the depth information of scenery can be extracted.

The above-described exemplary embodiments of the present invention are intended to be illustrative only. Those skilled in the art may devise numerous alternative embodiments without departing from the scope of the following claims.

We claim:

1. An apparatus for extracting scenery depth information, the apparatus comprising:
    an optical element; and
    a coding element placed on routes of object lights passing through the optical element, the coding element being configured to modulate point spread functions of the optical element, wherein the object lights carry scenery depth information;
    wherein codes of the coding element are specified by $$W(x, y) = \sum_{n,l,m} A_{nx} x^{2n} + A_{ny} y^{2n} + A_{lmxy} x^l y^m,$$

where x and y are coordinate positions of the coding element, n is a positive integer, l+m is an even number, $A_{nx}$ and $A_{ny}$ are the coefficients in terms $x^{2n}$ and $y^{2n}$ respectively, and $A_{lmxy}$ is the coefficient in term xy.

2. The apparatus of claim 1, wherein the optical element is a single lens, a lens set or a reflective imaging lens set.

3. The apparatus of claim 1, wherein the coding element is a wavefront phase coding element which modulates phases of wavefronts.

4. The apparatus of claim 1, wherein the coding element is a wavefront amplitude element which modulates amplitudes of wavefronts.

5. The apparatus of claim 1, wherein the coding element is a wavefront phase-amplitude coding element which modulates phases of wavefronts and amplitudes of wavefronts.

6. The apparatus of claim 1, wherein the coding element is associated with has axis symmetry characteristics.

7. The apparatus of claim 1, wherein the coding element is placed at a position of a diaphragm, near the diaphragm, at a position of an exit pupil, near the exit pupil, at a position of an entrance pupil or near the entrance pupil.

8. The apparatus of claim 1, wherein the coding element is a refractive element, a diffractive element or an element having refractive and diffractive characteristics.

9. The apparatus of claim 1, wherein the coding element is integrated with the optical element.

10. A method for extracting scenery depth information by using an optical apparatus including an optical element and a coding element, wherein the coding element is placed on routes of object lights passing through the optical element, the coding element is configured to modulate point spread functions of the optical element, and the object lights carry scenery depth information, the method comprising:

obtaining an image with the optical apparatus, wherein the optical apparatus comprises a wavefront phase coding element for modulating phases of wavefronts, wherein the phase codes are specified by $$W(x, y) = \sum_{n,l,m} A_{nx} x^{2n} + A_{ny} y^{2n} + A_{lmxy} x^l y^m,$$

where x and y are coordinate positions of the wavefront phase coding element, n is a positive integer, l+m is an even number, $A_{nx}$ and $A_{ny}$ are the coefficients in terms $x^{2n}$ and $y^{2n}$ respectively, and $A_{lmxy}$ is the coefficient in term xy;

obtaining at least one point spread function of the optical apparatus; and scanning areas of the image and performing restoration-comparison procedures in accordance with the point spread function.

11. The method of claim 10, further comprising:
obtaining depth information in accordance with results of the restoration-comparison procedures.

12. The method of claim 10, wherein the point spread function is obtained by measuring the optical apparatus or in accordance with design parameters of the optical apparatus.

13. The method of claim 10, wherein Wiener filters or direct inverse operations are used for the restoration-comparison procedures.

14. The method of claim 10, wherein the restoration-comparison procedures comprise comparison procedures, wherein the comparison procedures compare results of calculations of the mean square errors with thresholds determined by a user.

15. The method of claim 10, wherein the restoration-comparison procedures comprise comparison procedures, wherein the comparison procedures compare results of the edge detection operations with threshold values.

* * * * *